(12) United States Patent
Johnston et al.

(10) Patent No.: US 8,323,596 B2
(45) Date of Patent: Dec. 4, 2012

(54) METHOD FOR EXTRACTING ZINC FROM AQUEOUS AMMONIACAL SOLUTIONS

(75) Inventors: Garry Mervyn Johnston, Claremont (AU); Matthew Leslie Sutcliffe, Northland (NZ); Nicholas James Welham, Ballarat (AU)

(73) Assignee: Metaleach Limited (VG)

( * ) Notice: Subject to any disclaimer, the term of this patent is extended or adjusted under 35 U.S.C. 154(b) by 0 days.

(21) Appl. No.: 13/141,192

(22) PCT Filed: Dec. 22, 2009

(86) PCT No.: PCT/AU2009/001685
§ 371 (c)(1),
(2), (4) Date: Aug. 18, 2011

(87) PCT Pub. No.: WO2010/071932
PCT Pub. Date: Jul. 1, 2010

(65) Prior Publication Data
US 2011/0293493 A1    Dec. 1, 2011

(30) Foreign Application Priority Data

Dec. 24, 2008  (AU) ................................ 2008906664

(51) Int. Cl.
*B03C 1/00* (2006.01)
(52) U.S. Cl. .......................................... 423/100; 423/99
(58) Field of Classification Search ............... 423/99, 423/100
See application file for complete search history.

(56) References Cited

U.S. PATENT DOCUMENTS

| | | | |
|---|---|---|---|
| 4,015,980 A | 4/1977 | MacKay et al. | |
| 4,432,949 A * | 2/1984 | Hubred et al. | 423/54 |
| 4,563,256 A | 1/1986 | Sudderth et al. | |
| 5,433,855 A * | 7/1995 | Campbell et al. | 210/638 |
| 5,441,712 A * | 8/1995 | Duyvesteyn et al. | 423/99 |
| 5,788,844 A | 8/1998 | Olafson | |
| 6,726,887 B1 * | 4/2004 | Sugarman | 423/24 |

FOREIGN PATENT DOCUMENTS

GB            1470998 A  *  4/1977

* cited by examiner

*Primary Examiner* — Melvin C Mayes
*Assistant Examiner* — Melissa Stalder
(74) *Attorney, Agent, or Firm* — Harness, Dickey & Pierce, P.L.C.

(57) ABSTRACT

A method for extracting zinc from an aqueous ammoniacal zinc solution containing impurities, the method comprising the steps of:

(i) contacting the aqueous ammoniacal zinc solution containing impurities with an organic phase comprising an ammonium salt of an organic extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;

(ii) separating the zinc-enriched, ammonium-depleted organic phase from the ammonium-enriched, zinc-depleted aqueous phase containing impurities;

(iii) contacting the zinc-enriched, ammonium-depleted organic phase with an aqueous solution containing positively charged species, allowing transfer of the zinc from the organic phase and transfer of positively charged species from the aqueous phase, thereby providing an aqueous zinc solution and an organic phase containing a zinc-depleted organic extractant; and (iv) recovering the zinc from the aqueous zinc solution.

22 Claims, 2 Drawing Sheets

METHOD FOR EXTRACTING ZINC FROM AQUEOUS AMMONIACAL SOLUTIONS

CROSS-REFERENCE TO RELATED APPLICATIONS

This application is a 371 U.S. National Stage of International Application No. PCT/AU2009/001685, filed Dec. 22, 2009. This application claims priority to Australian Patent Application No. 2008906664, filed Dec. 24, 2008. The disclosures of the above applications are incorporated herein by reference in their entirety.

FIELD OF THE INVENTION

The present invention relates to a method for extracting zinc from aqueous solutions. More particularly, the present invention relates to a method for extracting zinc from aqueous ammoniacal zinc solutions containing impurities, such as those solutions typically produced by ammoniacal leaching of zinc-containing ores or calcines.

BACKGROUND ART

Sulphide deposits have dominated production of primary zinc. The sulphides are readily concentrated by flotation and the concentrate is either smelted or undergoes a roast-acid leach-electrowinning process to recover zinc. Oxide deposits are not readily concentrated. However, increasing zinc demand has resulted in increased interest in processing oxidised zinc ores. In one instance of which the inventors are aware, a zinc silicate ore has been subjected to an acid leach, followed by solvent extraction and electrowinning.

However, acid leaching is non-selective, with many elements dissolving in addition to the target metal, most notably iron and silicon. These elements have to be removed subsequently, increasing substantially the complexity of the process. Furthermore, additionally, some silica-containing zinc ores have an additional complication. For example, willemite ($Zn_2SiO_4$) has been leached with acid, but tends to give a silica gel making solid-liquid separation difficult, similar problems have been reported for hemimorphite ($Zn_4Si_2O_7$ $(OH)_2 \cdot H_2O$) (S. Espiari, F. Rashchi, S. K. Sadrnezhaad, Hydrometallurgical treatment of tailings with high zinc content; Hydrometallurgy, 2006, 82 (1-2) 54-62).

The process at the Skorpion Mine, Rosh Pinah, Namibia has been previously described in detail (J. Gnoinski, Skorpion Zinc: optimization and innovation, The Journal of The Southern African Institute of Mining and Metallurgy 2007, 107(10) 657-662) and uses carefully controlled conditions to prevent gel formation. The leaching at Skorpion takes place at 50-60° C. which, although it enhances the solubility of silica, results in formation of a filterable silica precipitate when the pH is raised using lime (CaO), iron and aluminium are also precipitated during this step. The solid precipitate has then to be separated from the pregnant solution via thickening. The raised temperature, necessity to precipitate impurities and then perform solid-liquid separation all increase the complexity of the flowsheet and both capital and operating costs.

The removal of impurities from acid solutions can be achieved either by precipitation followed by cementation (as practiced by the roast-leach-electrowin plants) or by solvent extraction (as practiced at Skorpion). Further technical details of the precipitation and cementation stages of the roast-leach-electrowin process can be found in "The Extractive Metallurgy of Zinc" by R. J. Sinclair, AusIMM, 2005.

The complexity of the solvent extraction process at Skorpion is clear with a total of eight consecutive stages required to achieve the desired purity. (K. C. Sole, A. M. Feather and P. M. Cole, Solvent extraction in southern Africa: An update of some recent hydrometallurgical developments; Hydrometallurgy, 78 (1-2) (2005) 52-78).

Additionally, in the presence of oxide, carbonate or hydroxide mineralogy (zincite ZnO, hydrozincite $2ZnCO_3 \cdot 3Zn(OH)_2$ and smithsonite $ZnCO_3$) the acid consumption may also be extremely high making it uneconomic to process the ore using acid.

The method of leaching of the present invention has as one object thereof to at least partially overcome the abovementioned problems associated with the prior art, or to at least provide a commercially useful alternative thereto.

The preceding discussion of the background art is intended to facilitate an understanding of the present invention only. The discussion is not an acknowledgement or admission that any of the material referred to is or was part of the common general knowledge as at the priority date of the application.

Throughout this specification, unless the context requires otherwise, the word "comprise", or variations such as "comprises" or "comprising", will be understood to imply the inclusion of a stated integer or group of integers but not the exclusion of any other integer or group of integers.

Throughout this specification, unless the context requires otherwise, the term "ore" or variations thereof, will be understood to include, for example, the product of one or more pre-treatment steps, such as a roast or calcination steps, or one or more concentration steps, but is not limited thereto.

DISCLOSURE OF THE INVENTION

In accordance with the present invention, there is provided a method for extracting zinc from an aqueous ammoniacal zinc solution containing impurities, the method comprising the steps of:
  (i) contacting the aqueous ammoniacal zinc solution containing impurities with an organic phase comprising an ammonium salt of an organic extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;
  (ii) separating the zinc-enriched, ammonium-depleted organic phase from the ammonium-enriched, zinc-depleted aqueous phase containing impurities;
  (iii) contacting the zinc-enriched, ammonium-depleted organic phase with an aqueous solution containing positively charged species, allowing transfer of the zinc from the organic phase and transfer of positively charged species from the aqueous phase, thereby providing an aqueous zinc solution and an organic phase containing a zinc-depleted organic extractant; and
  (iv) recovering the zinc from the aqueous zinc solution.

In one form of the invention, the aqueous solution containing positively charged species of step (iii) is an acidic solution, such that step (iii) more specifically comprises:
  contacting the zinc-enriched, ammonium-depleted organic phase with an acidic aqueous solution, allowing transfer of the zinc from the organic phase and transfer of protons from the aqueous phase, thereby providing an aqueous zinc solution and an organic phase containing a zinc-depleted organic extractant.

Preferably, where step (iii) specifically comprises contacting the zinc-enriched, ammonium-depleted organic phase with an acidic aqueous solution, allowing transfer of the zinc from the organic phase and transfer of protons from the aqueous phase, thereby providing an aqueous zinc solution and an organic phase containing a zinc-depleted organic extractant, the method further comprises the step of:

contacting the zinc-depleted extractant with an aqueous ammonium solution to produce an ammonium salt of the organic acid extractant.

In a preferred form of the invention, the aqueous solution containing positively charged species of step (iii) is an aqueous ammonium solution, such that step (iii) more specifically comprises:

contacting the zinc-enriched, ammonium-depleted organic phase with an aqueous solution of ammonia, allowing transfer of the zinc from the organic phase and transfer of ammonium from the aqueous phase, thereby providing an aqueous ammoniacal zinc solution and an organic phase containing an ammonium salt of the organic extractant.

Accordingly, in a preferred form of the invention, the method comprises the steps of:

(i) contacting the aqueous ammoniacal zinc solution containing impurities with an organic phase comprising an ammonium salt of an organic extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;

(ii) separating the zinc-enriched, ammonium-depleted organic phase from the ammonium-enriched, zinc-depleted aqueous phase containing impurities;

(iii) contacting the zinc-enriched, ammonium-depleted organic phase with an aqueous solution of ammonia, allowing transfer of the zinc from the organic phase and transfer of ammonium from the aqueous phase, thereby providing an aqueous ammoniacal zinc solution and an organic phase containing an ammonium salt of the organic extractant; and (iv) recovering the zinc from the aqueous ammoniacal zinc solution.

Throughout this specification, unless the context requires otherwise, the phrase ammonium salt of an organic extractant refers to an organic extractant in which at least a portion of the protons have been replaced by ammonium ions. Thus, the phrase organic extractant includes organic acid extractants, together with organic extractants that are not universally regarded in the art as acids, but which nonetheless possess protons that may be exchanged for ammonium ions, such as the oxime class of organic extractants.

In a preferred form of the invention, the aqueous ammoniacal zinc solution is produced by ammoniacal leaching of a zinc-containing ore. In a preferred form of the invention, the aqueous ammoniacal zinc solution is produced by ammoniacal leaching of an oxidised zinc-containing ore.

Ammoniacal leaching has a number of advantages over acid leaching. The alkaline pH ensures iron is not dissolved, thereby removing an iron removal stage from the overall process. Jarosite formation is prevented. Silica does not dissolve removing the necessity to either using a narrow window of operating conditions to avoid gel formation or a silica precipitation stage. Gypsum formation is minimised as the carbonate present precipitates calcium.

In a preferred form, the method of the present invention is performed in a continuous manner, and at least a portion of the organic phase containing an ammonium salt of an organic extractant of step (i) is provided by the organic phase containing an ammonium salt of the organic extractant provided by subsequent method steps.

In a preferred form, the method of the present invention is performed at elevated temperature.

In a preferred form, the method of the present invention is performed at 15-80° C. In a preferred form, the method of the present invention is performed at 15-70° C. In a preferred form, the method of the present invention is performed at 15-60° C. In a preferred form, the method of the present invention is performed at 15-50° C. In a preferred form, the method of the present invention is performed at 15-40° C. In a preferred form, the method of the present invention is performed at 15-30° C. In a preferred form, the method of the present invention is performed at 15-25° C.

In a preferred form, the method of the present invention is performed at 20-80° C. In a preferred form, the method of the present invention is performed at 20-70° C. In a preferred form, the method of the present invention is performed at 20-60° C. In a preferred form, the method of the present invention is performed at 20-50° C. In a preferred form, the method of the present invention is performed at 20-40° C. In a preferred form, the method of the present invention is at 20-30° C.

In a preferred form, the method of the present invention is performed at 25-80° C. In a preferred form, the method of the present invention is performed at 25-70° C. In a preferred form, the method of the present invention is performed at 25-60° C. In a preferred form, the method of the present invention is performed at 25-50° C. In a preferred form, the method of the present invention is performed at 25-40° C. In a preferred form, the method of the present invention is performed at 25-30° C.

In a preferred form, the method of the present invention is performed at 30-80° C. In a preferred form, the method of the present invention is performed at 30-70° C. In a preferred form, the method of the present invention is performed at 30-60° C. In a preferred form, the method of the present invention is performed at 30-50° C. In a preferred form, the method of the present invention is performed at 30-40° C.

The broad concept of solvent extraction-based recovery of metals is well known: an aqueous solution containing target metals and impurities is exposed to an organic phase containing an extractant, the extractant allows the metal to be extracted into the organic phase while the impurities remain in the aqueous phase, the two phases are separated, the organic phase is then exposed to a clean aqueous phase and the target metal passes into that phase from which it is recovered. However, cost-effective application of the broad principle to a specific aqueous solution of a target metal is rarely straightforward, and the application of solvent extraction principles to aqueous ammoniacal zinc solutions is complicated by several factors.

The stability of zinc in aqueous ammoniacal solutions is dependent on pH. At low pH, zinc is soluble. However, at moderate pH zinc precipitates as a hydroxide $Zn(OH)_2$. At alkaline pH, the zinc hydroxide redissolves as the zincate ion ($ZnO_2^{2-}$ or $Zn(OH)_4^{2-}$). The addition of ammonia lowers the pH at which the zinc hydroxide redissolves due to the formation of the tetrammine zinc ion $Zn(NH_3)_4^{2+}$.

While precipitation presents little impediment to the extraction of zinc from acidic leach solutions, the inventors have discovered that the transfer of protons to the aqueous phase from an acidic organic extractant has a practical effect on the stability of the remaining zinc due to the concomitant reduction in pH. Mitigating this effect solely by the addition of alkali to the aqueous zinc phase has obvious cost implications.

Furthermore, while neutralisation of the organic acid extractant prior to exposure to the aqueous zinc solution, for example with sodium hydroxide, will prevent the pH of the aqueous zinc phase dropping, such an approach has appreciable cost implications: acid stripping the zinc from the organic extractant regenerates the organic acid extractant, which must be again neutralised prior to exposure to new aqueous zinc solution.

Utilising an ammonium salt of the organic extractant significantly reduces the effect on pH of the residual aqueous solution. In forms of the invention where the zinc-loaded extractant is stripped with an aqueous ammonia solution, the extractant is regenerated in a form suitable for reuse without the need for significant quantities of additional reagents.

The concept can be summarised by the following reactions where R is the organic extractant (in acid form RH):

Acid extractant $2HR + Zn^{2+} = ZnR_2 + 2H^+$

Ammoniacal extractant $2NH_4R + Zn^{2+} = ZnR_2 + 2NH_4^+$

Acid stripping $ZnR_2 + 2H^+ = Zn^{2+} + HR$

Ammoniacal stripping $2NH_4^+ + ZnR_2 = Zn^{2+} + 2NH_4R$

Figure 1:
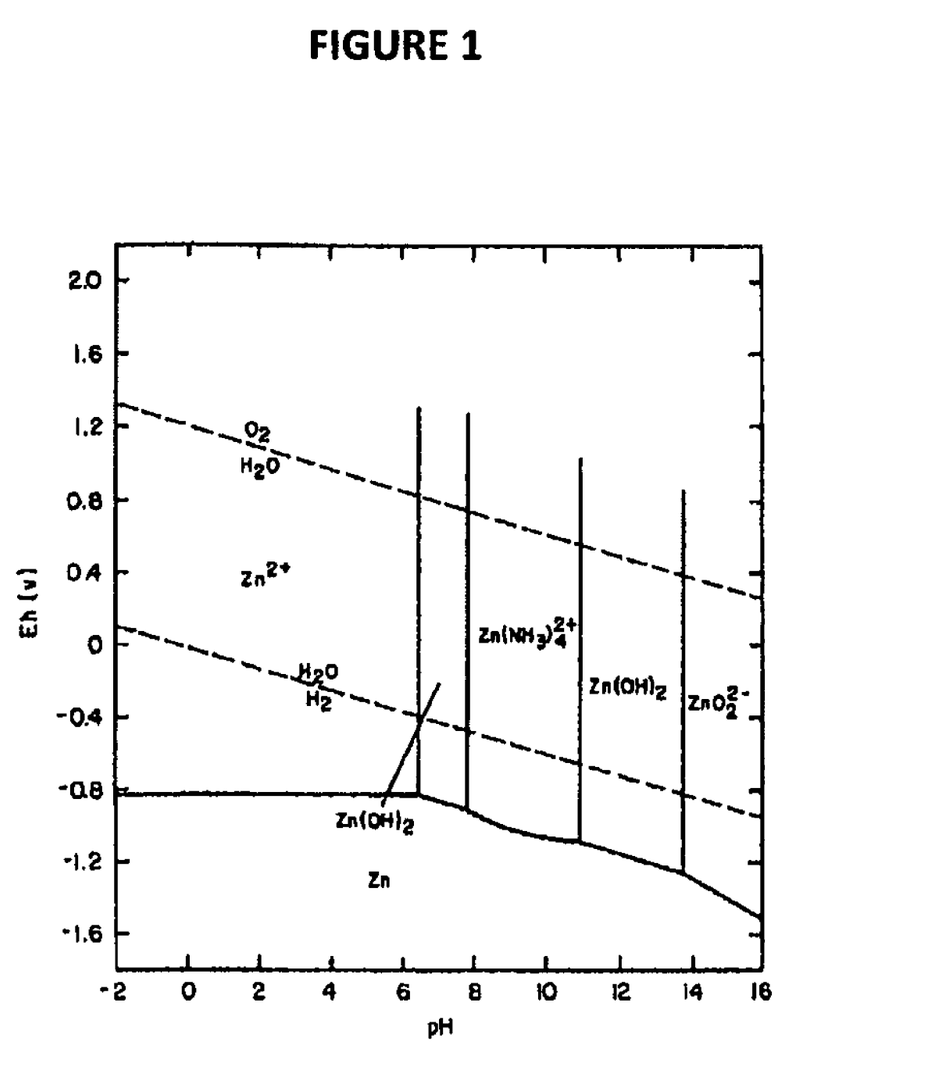
FIG. 1 is a potential-pH diagram showing the solubility of zinc as a function of pH under a certain set of conditions.

The solubility of zinc as the tetrammine zinc complex $Zn(NH_3)_4^{2+}$ is a function of pH, temperature and total ammonia concentration. FIG. 1 shows one set of conditions (630 ppm Zn, 17 g/L $(NH_3+NH_4^{\pm})$ at 25° C.) which will serve as a typical example of the solubility of zinc as a function of pH.

The diagram of FIG. 1 shows that zinc is soluble at below about pH 6 and above about pH 14 as $Zn^{2+}$ and $ZnO_2^{2-}$ (sometimes also written $Zn(OH)_4^{2-}$) respectively. Between these pH zinc forms an insoluble hydroxide $Zn(OH)_2$. In the presence of ammonia the hydroxide redissolves to form the tetrammine zinc complex ion, $Zn(NH_3)_4^{2+}$. The pH range where this ion is predominant increases with ammonia concentration.

Solubilities generally increase with temperature but the volatility of ammonia will provide an upper practical limitation of operation. Indeed one method of recovering zinc from solution is to remove ammonia from the solution by volatilisation. Removal of ammonia reduces the amount of ammonia complexed to zinc thereby reducing the solubility of the zinc itself, this is summarised by the following reaction:

$Zn(NH_3)_4^{2+} + 2H_2O = 4NH_3(gas) + Zn(OH)_2(solid) + 2H^+$

Clearly, by the same token, a low ammonia concentration will give a lower zinc solubility than a high ammonia concentration. For every mole of zinc in solution there has to be four moles of dissolved ammonia. In reality, an excess of ammonia is necessary to ensure stability in the event that the pH fluctuates.

A high ammonia concentration will also increase the pH range over which zinc is soluble, by increasing the stability of the zinc ammine complex against hydrolysis.

In a preferred form of the invention, the step of:
contacting the aqueous ammoniacal zinc solution containing impurities with an organic phase comprising an ammonium salt of an organic extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;

more specifically comprises:
contacting the aqueous ammoniacal zinc solution containing impurities with an organic phase comprising an ammonium salt of an organic extractant and a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities, wherein the pH of the aqueous ammoniacal zinc solution is maintained between about 6 and about 12.

In a preferred form of the invention, the pH of the aqueous ammoniacal zinc solution containing impurities is maintained between about 7 and about 12. Preferably still, the pH of the aqueous ammoniacal zinc solution containing impurities of step (i) is between about 7 and about 11. Preferably still, the pH of the aqueous ammoniacal zinc solution containing impurities of step (i) is between about 8 and about 11. Preferably still, the pH of the aqueous ammoniacal zinc solution containing impurities of step (i) is between about 8 and about 10. Preferably still, the pH of the aqueous ammoniacal zinc solution containing impurities of step (i) is between about 8 and about 9. Preferably still, the pH of the aqueous ammoniacal zinc solution containing impurities of step (i) is between about 9 and about 10. Preferably still, the pH of the aqueous ammoniacal zinc solution containing impurities of step (i) is between about 8.5 and about 9.5. Preferably still, the pH of the aqueous ammoniacal zinc solution containing impurities of step (i) is between about 8.5 and about 9.5.

In a highly preferred form of the invention, the step of:
contacting the aqueous ammoniacal zinc solution containing impurities with an organic phase comprising an ammonium salt of an organic extractant and a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;

more specifically comprises:
contacting the aqueous ammoniacal zinc solution containing impurities with an organic phase comprising an ammonium salt of an organic extractant and a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities, wherein the pH of the aqueous ammoniacal zinc solution is maintained at approximately pH 9.5.

Organic extractants of potential utility in the method of the present invention can be found in "Solvent Extraction" by G. M. Ritcey, 2006, vol. 1, p. 73-79, the contents of which are intended to be incorporated herein, by reference.

The organic extractant may be selected from the group: carboxylic acid derivatives, organic derivatives of phosphorus-based acids, organic derivatives of sulfur-based acids and oximes.

In a preferred form of the invention, where the organic extractant is an organic derivative of a sulfur-based acid, the organic extractant is an organic derivative of sulfonic acid, such as 5,8-dinonylnapthylsulphonic acid.

Examples of organic extractants in the form of carboxylic acid derivatives include alkyl monocarboxylic acids. The alkyl radical of the alkyl monocarboxylic acids may be linear or branched. Preferably, the alkyl radical contains 4 to 18 carbon atoms. In one form of the invention, the organic extractant is napthenic acid or neodecanoic acid.

Examples of organic extractants in the form of oximes include: 2-hydroxy-3-dodecylbenzophenone oxime, 2-hydroxy-5-acetophenone oxime, 5-dodecylsalicycladoxime, 2-hydroxy-5-nonylacetophenone oxime, 2-hydroxy-5-nonylbenzaldehyde oxime.

Where the organic extractant is an organic derivative of a phosphorus-based acid, the phosphorus-based acid may be selected from the group: phosphoric acid, phosphonic acid, and phosphinic acid, and thio-derivatives thereof.

The organic extractant may be mixed with one or more further organic compounds, including further organic extractants, to provide a synergistic mixture with improved properties over the separate components.

In a preferred form of the invention, the organic extractant is an organic derivative of phosphoric acid. Preferably still, the organic extractant is an organo-orthophosphoric acid-derivative. In a preferred form of the invention, the organic extractant is a mono- or dialkyl, or mono- or di-(alkylphenyl) orthophosphoric acid. The alkyl radical may be linear or branched. Preferably, the alkyl radical contains 4 to 18 carbon atoms.

In a highly preferred form of the invention, the organic extractant is di(2-ethylhexyl) phosphoric acid (D2EHPA).

In one form of the invention, the diluent may comprise: an aliphatic solvent, an aromatic solvent, or a mixture thereof.

In a preferred form of the invention, the diluent substantially comprises kerosene.

In a preferred form of the invention, the concentration of zinc in the aqueous ammoniacal zinc solution containing impurities of step (i) is between about 0.1 g/L and about 150 g/L. Preferably still, the concentration of zinc in the aqueous ammoniacal zinc solution containing impurities of step (i) is between about 0.1 g/L and about 100 g/L. Preferably still, the concentration of zinc in the aqueous ammoniacal zinc solution containing impurities of step (i) is between about 0.1 g/L and about 50 g/L. Preferably still, the concentration of zinc in the aqueous ammoniacal zinc solution containing impurities of step (i) is between about 0.1 g/L and about 20 g/L. Preferably still, the concentration of zinc in the aqueous ammoniacal zinc solution containing impurities of step (i) is between about 0.1 g/L and about 10 g/L. Preferably still, the concentration of zinc in the aqueous ammoniacal zinc solution containing impurities of step (i) is between about 0.1 g/L and about 5 g/L. Preferably still, the concentration of zinc in the aqueous ammoniacal zinc solution containing impurities of step (i) is between about 0.1 g/L and about 2 g/L. Preferably still, the concentration of zinc in the aqueous ammoniacal zinc solution containing impurities of step (i) is between about 0.1 g/L and about 1 g/L.

In a preferred form of the invention, the concentration of zinc in the aqueous ammoniacal zinc solution containing impurities of step (i) is between about 0.5 g/L and about 150 g/L. Preferably still, the concentration of zinc in the aqueous ammoniacal zinc solution containing impurities of step (i) is between about 0.5 g/L and about 100 g/L. Preferably still, the concentration of zinc in the aqueous ammoniacal zinc solution containing impurities of step (i) is between about 0.5 g/L and about 50 g/L. Preferably still, the concentration of zinc in the aqueous ammoniacal zinc solution containing impurities of step (i) is between about 0.5 g/L and about 20 g/L. Preferably still, the concentration of zinc in the aqueous ammoniacal zinc solution containing impurities of step (i) is between about 0.5 g/L and about 10 g/L. Preferably still, the concentration of zinc in the aqueous ammoniacal zinc solution containing impurities of step (i) is between about 0.5 g/L and about 5 g/L. Preferably still, the concentration of zinc in the aqueous ammoniacal zinc solution containing impurities of step (i) is between about 0.5 g/L and about 2 g/L. Preferably still, the concentration of zinc in the aqueous ammoniacal zinc solution containing impurities of step (i) is between about 0.5 g/L and about 1 g/L.

In a preferred form of the invention, the concentration of zinc in the aqueous ammoniacal zinc solution containing impurities of step (i) is between about 1 g/L and about 150 g/L. Preferably still, the concentration of zinc in the aqueous ammoniacal zinc solution containing impurities of step (i) is between about 1 g/L and about 100 g/L. Preferably still, the concentration of zinc in the aqueous ammoniacal zinc solution containing impurities of step (i) is between about 1 g/L and about 50 g/L. Preferably still, the concentration of zinc in the aqueous ammoniacal zinc solution containing impurities of step (i) is between about 1 g/L and about 20 g/L. Preferably still, the concentration of zinc in the aqueous ammoniacal zinc solution containing impurities of step (i) is between about 1 g/L and about 10 g/L. Preferably still, the concentration of zinc in the aqueous ammoniacal zinc solution containing impurities of step (i) is between about 1 g/L and about 5 g/L. Preferably still, the concentration of zinc in the aqueous ammoniacal zinc solution containing impurities of step (i) is between about 1 g/L and about 2 g/L.

Furthermore, it has been discovered that the separation of the aqueous and organic phases is affected by the pH of the aqueous phase. Problems with phase separation are well known within the solvent extraction industry. In some cases, it is possible for the organic phase to remain as an emulsion within the aqueous phase or for there to be more than two phases. A number of strategies are available to mitigate these problems, notably control of the aqueous phase pH. Further organic compounds are sometime added to aid phase disengagement, one compound used for this purpose is decan-1-ol. More information on this problem can be found in "Solvent Extraction" by G. M. Ritcey, 2006.

In one form of the present invention, the step of:
contacting the aqueous ammoniacal zinc solution containing impurities with an organic phase comprising an ammonium salt of an organic extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;
more specifically comprises the step of:
contacting the aqueous ammoniacal zinc solution containing impurities with an organic phase comprising an ammonium salt of an organic extractant and a hydrophobic diluent, allowing transfer of the zinc to the organic phase and transfer of ammonium to the aqueous phase, in the presence of a phase-disengagement enhancing compound, thereby providing a zinc-enriched, ammonium-depleted organic phase and an ammonium-enriched, zinc-depleted aqueous phase containing impurities.

In one form of the invention, the phase-disengagement enhancing compound is an alcohol. Examples include decan-1-ol, 2-ethyl hexanol, and p-nonyl phenol.

In another form of the invention, the phase-disengagement enhancing compound is tributyl phosphate.

In another form of the invention, the phase-disengagement enhancing compound is trioctyl phosphine oxide.

The inventors have discovered that, for certain organic acid extractants, separation of the organic and aqueous phases occurs at viable pH levels (in terms of zinc stability) without the use of phase-disengagement enhancing compound. For example, where the organic extractant is (D2EHPA), maintaining the pH of the aqueous phase below 10 negates the need for phase-disengagement enhancing compound.

In one form of the invention, the step of recovering the recovering the zinc from the aqueous ammoniacal zinc solution may be performed by electrowinning.

In one form of the invention, the step of recovering the recovering the zinc from the aqueous ammoniacal zinc solution may be performed by steam-stripping resulting in precipitation of the zinc.

In one form of the invention, the step of recovering the recovering the zinc from the aqueous ammoniacal zinc solution may be performed by precipitation by adjusting the pH using acid or alkali.

In one form of the invention, the step of recovering the recovering the zinc from the aqueous ammoniacal zinc solution may be performed by spray drying.

It will be understood by those skilled in the art that the choice of recovery method is based on the relative economic benefits. The choice is further defined by the concentration of zinc in the purified solution.

In a preferred form of the invention, steam stripping is used if the concentration of zinc in the purified solution is between 100 g/L and saturation. In a preferred form of the invention, steam stripping is used if the concentration of zinc in the purified solution is between 50 g/L and saturation. In a preferred form of the invention, steam stripping is used if the concentration of zinc in the purified solution is between 20 g/L and saturation.

In a preferred form of the invention, steam stripping is used if the concentration of zinc in the purified solution is between 10 g/L and saturation. In a preferred form of the invention, steam stripping is used if the concentration of zinc in the purified solution is between 5 g/L and saturation. In a preferred form of the invention, steam stripping is used if the concentration of zinc in the purified solution is between 2 g/L and saturation.

In a preferred form of the invention, boiling is used if the concentration of zinc in the purified solution is between 100 g/L and saturation. In a preferred form of the invention, boiling is used if the concentration of zinc in the purified solution is between 50 g/L and saturation. In a preferred form of the invention, boiling is used if the concentration of zinc in the purified solution is between 20 g/L and saturation. In a preferred form of the invention, boiling is used if the concentration of zinc in the purified solution is between 10 g/L and saturation. In a preferred form of the invention, boiling is used if the concentration of zinc in the purified solution is between 5 g/L and saturation. In a preferred form of the invention, boiling is used if the concentration of zinc in the purified solution is between 2 g/L and saturation.

In a preferred form of the invention, electrowinning is used if the concentration of zinc in the purified solution is between 100 g/L and saturation. In a preferred form of the invention, electrowinning is used if the concentration of zinc in the purified solution is between 50 g/L and saturation. In a preferred form of the invention, electrowinning is used if the concentration of zinc in the purified solution is between 20 g/L and saturation.

In a preferred form of the invention, electrowinning is used if the concentration of zinc in the purified solution is between 10 g/L and saturation. In a preferred form of the invention, electrowinning is used if the concentration of zinc in the purified solution is between 5 g/L and saturation. In a preferred form of the invention, electrowinning is used if the concentration of zinc in the purified solution is between 2 g/L and saturation.

In a preferred form of the invention, precipitation by pH adjustment is used if the concentration of zinc in the purified solution is between 100 g/L and saturation. In a preferred form of the invention, precipitation by pH adjustment is used if the concentration of zinc in the purified solution is between 50 g/L and saturation. In a preferred form of the invention, precipitation by pH adjustment is used if the concentration of zinc in the purified solution is between 20 g/L and saturation. In a preferred form of the invention, precipitation by pH adjustment is used if the concentration of zinc in the purified solution is between 10 g/L and saturation. In a preferred form of the invention, precipitation by pH adjustment is used if the concentration of zinc in the purified solution is between 5 g/L and saturation. In a preferred form of the invention, precipitation by pH adjustment is used if the concentration of zinc in the purified solution is between 2 g/L and saturation.

In a preferred form of the invention, spray drying is used if the concentration of zinc in the purified solution is between 100 g/L and saturation. In a preferred form of the invention, spray drying is used if the concentration of zinc in the purified solution is between 50 g/L and saturation. In a preferred form of the invention, spray drying is used if the concentration of zinc in the purified solution is between 20 g/L and saturation. In a preferred form of the invention, spray drying is used if the concentration of zinc in the purified solution is between 10 g/L and saturation. In a preferred form of the invention, spray drying is used if the concentration of zinc in the purified solution is between 5 g/L and saturation. In a preferred form of the invention, spray drying is used if the concentration of zinc in the purified solution is between 2 g/L and saturation.

In a preferred form of the invention, the free ammonia concentration of the aqueous ammoniacal zinc solution containing impurities is between about 0.1 and 150 g/L.

Ammonia concentrations in excess of this range impede the transfer of zinc into the organic phase, and ammonia concentrations below this range are typically insufficient to maintain zinc in solution.

Preferably still, the free ammonia concentration of the aqueous ammoniacal zinc solution containing impurities is between about 0.1 and 100 g/L. Preferably still, the free ammonia concentration of the aqueous ammoniacal zinc solution containing impurities is between about 0.1 and 50 g/L. Preferably still, the free ammonia concentration of the aqueous ammoniacal zinc solution containing impurities is between about 0.1 and 20 g/L. Preferably still, the free ammonia concentration of the aqueous ammoniacal zinc solution containing impurities is between about 0.1 and 10 g/L. Preferably still, the free ammonia concentration of the aqueous ammoniacal zinc solution containing impurities is between about 0.1 and 5 g/L. Preferably still, the free ammonia concentration of the aqueous ammoniacal zinc solution containing impurities is between about 0.1 and 2 g/L. Preferably still, the free ammonia concentration of the aqueous ammoniacal zinc solution containing impurities is between about 0.1 and 1 g/L.

Preferably still, the free ammonia concentration of the aqueous ammoniacal zinc solution containing impurities is between about 0.5 and 150 g/L. Preferably still, the free ammonia concentration of the aqueous ammoniacal zinc solution containing impurities is between about 0.5 and 100 g/L. Preferably still, the free ammonia concentration of the aqueous ammoniacal zinc solution containing impurities is between about 0.5 and 50 g/L. Preferably still, the free ammonia concentration of the aqueous ammoniacal zinc solution containing impurities is between about 0.5 and 20 g/L. Preferably still, the free ammonia concentration of the aqueous ammoniacal zinc solution containing impurities is between about 0.5 and 10 g/L. Preferably still, the free ammonia concentration of the aqueous ammoniacal zinc solution containing impurities is between about 0.5 and 5 g/L. Preferably still, the free ammonia concentration of the aqueous ammoniacal zinc solution containing impurities is between about 0.5 and 2 g/L. Preferably still, the free ammonia concentration of the aqueous ammoniacal zinc solution containing impurities is between about 0.5 and 1 g/L.

Preferably still, the free ammonia concentration of the aqueous ammoniacal zinc solution containing impurities is between about 1 g/L and 150 g/L. Preferably still, the free ammonia concentration of the aqueous ammoniacal zinc solution containing impurities is between about 1 and 100 g/L. Preferably still, the free ammonia concentration of the aqueous ammoniacal zinc solution containing impurities is between about 1 and 50 g/L. Preferably still, the free ammonia concentration of the aqueous ammoniacal zinc solution containing impurities is between about 1 and 20 g/L. Preferably still, the free ammonia concentration of the aqueous ammoniacal zinc solution containing impurities is between about 1 and 10 g/L. Preferably still, the free ammonia concentration of the aqueous ammoniacal zinc solution containing impurities is between about 1 and 5 g/L.

Preferably still, the free ammonia concentration of the aqueous ammoniacal zinc solution containing impurities is between about 2 g/L and 150 g/L. Preferably still, the free ammonia concentration of the aqueous ammoniacal zinc solution containing impurities is between about 2 and 100 g/L. Preferably still, the free ammonia concentration of the aqueous ammoniacal zinc solution containing impurities is between about 2 and 50 g/L. Preferably still, the free ammonia concentration of the aqueous ammoniacal zinc solution containing impurities is between about 2 and 20 g/L. Preferably still, the free ammonia concentration of the aqueous ammoniacal zinc solution containing impurities is between about 2 and 20 g/L. Preferably still, the free ammonia concentration of the aqueous ammoniacal zinc solution containing impurities is between about 2 and 5 g/L.

Preferably still, the free ammonia concentration of the aqueous ammoniacal zinc solution containing impurities is between about 5 g/L and 150 g/L. Preferably still, the free ammonia concentration of the aqueous ammoniacal zinc solution containing impurities is between about 5 and 100 g/L. Preferably still, the free ammonia concentration of the aqueous ammoniacal zinc solution containing impurities is between about 5 and 50 g/L. Preferably still, the free ammonia concentration of the aqueous ammoniacal zinc solution containing impurities is between about 5 and 20 g/L. Preferably still, the free ammonia concentration of the aqueous ammoniacal zinc solution containing impurities is between about 5 and 10 g/L.

Preferably still, the free ammonia concentration of the aqueous ammoniacal zinc solution containing impurities is between about 10 g/L and 150 g/L. Preferably still, the free ammonia concentration of the aqueous ammoniacal zinc solution containing impurities is between about 10 and 100 g/L. Preferably still, the free ammonia concentration of the aqueous ammoniacal zinc solution containing impurities is between about 10 and 50 g/L. Preferably still, the free ammonia concentration of the aqueous ammoniacal zinc solution containing impurities is between about 10 and 20 g/L.

Preferably still, the free ammonia concentration of the aqueous ammoniacal zinc solution containing impurities is between about 20 g/L and 150 g/L. Preferably still, the free ammonia concentration of the aqueous ammoniacal zinc solution containing impurities is between about 20 and 100 g/L. Preferably still, the free ammonia concentration of the aqueous ammoniacal zinc solution containing impurities is between about 20 and 50 g/L.

BRIEF DESCRIPTION OF THE DRAWINGS

One embodiment of the method for extracting zinc from an aqueous ammoniacal zinc solution of the present invention will now be described with reference to FIG. 2, which is a flow diagram representing the method of the embodiment, in the context of an aqueous ammoniacal zinc solution produced by the ammoniacal leaching of a zinc ore.

The description of the embodiment of the invention should not be understood to in any way limit the generality of the foregoing description of the invention.

BEST MODE(S) FOR CARRYING OUT THE INVENTION

Figure 2:
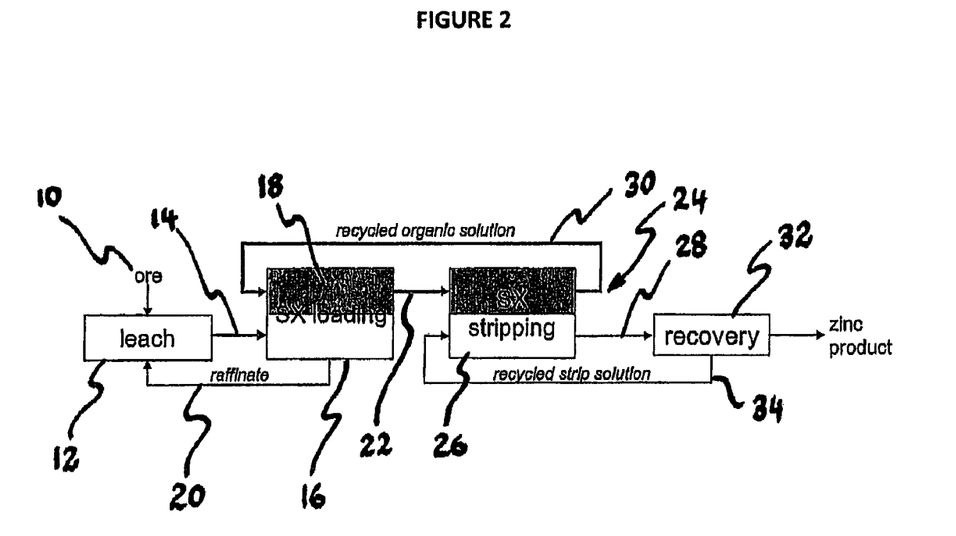

With Reference to FIG. 2, a zinc ore 10 is leached 12 in an ammoniacal ammonium carbonate solution to produce an aqueous ammoniacal zinc-rich solution 14 and a zinc-depleted solid tailings (not shown), which is discarded. The pH of the aqueous ammoniacal zinc-rich solution 14 is approximately 7-11. The aqueous ammoniacal zinc-rich solution 14 is then introduced into a solvent extraction loading stage 16, in which the aqueous ammoniacal zinc-rich solution 14 is contacted with the ammonium salt of the organic extractant, in the form of D2EHPA, dissolved in a suitable organic phase diluent 18. The zinc is transferred into the organic phase according to the equation:

$$2NH_4R + Zn^{2+} = ZnR_2 + 2NH_4^+$$

The ammonium so produced is exchanged into the aqueous phase, potentially causing a minor change in pH, but not to the extent that zinc is caused to precipitate. The zinc-depleted aqueous ammoniacal solution 20 is recycled back to the leach stage 12. The zinc-enriched, ammonium-depleted organic phase 22 proceeds to a solvent extraction stripping stage 24. In the stripping stage 24 the zinc-enriched, ammonium-depleted organic phase 22 is contacted with an aqueous solution of ammonia 26. The zinc zinc-enriched, ammonium-depleted organic phase 22 is at least partially displaced by the ammonia of the aqueous solution of ammonia 26, providing an aqueous ammoniacal zinc solution 28 and an organic phase containing an ammonium salt of the organic acid extractant 30, is recycled to the solvent extraction loading stage 16. The aqueous ammoniacal zinc solution 28 proceeds to a metal recovery stage 32 from which the zinc-depleted solution 34 may be recycled back to the stripping stage.

EXAMPLES

The invention will now be described with reference to a series of examples. The examples should not be understood as in any way limiting the generality of the preceding description of the invention.

Effect of Solution pH

Three master solutions were prepared by dissolving a known mass of zinc calcine (obtained by roasting of zinc sulphide flotation concentrate) in ammoniacal—ammonium carbonate solution. The approximate zinc tenors were 4.7, 13.9 and 34.2 g/L.

25 mL of each of these solutions were shaken with 25 mL of 10 vol % D2EHPA dissolved in kerosene. After separation, the aqueous was replaced and reshaken, after separation, a third volume of fresh aqueous was added and shaken. The final, zinc-loaded organic solution was separated and mixed with 5 mL of 150 g/L $H_2SO_4$, after settling the aqueous was replaced with fresh acid and reshaken, settled and the aqueous removed for analysis.

It was noted that the highest tenor zinc solutions resulted in poor settling after mixing and in some cases a third phase formed. Crud formation was also evident for the highest zinc solutions. Without wishing to be bound by theory, this crud is most probably due to the precipitation of zinc hydroxide as DEHPA exchanges two protons for each zinc ion thereby lowering the pH of the solution to below that where zinc hydroxide precipitates.

Loading of Cyanex 272 (bis(2,4,4-trimethylpentyl)phosphinic acid) and D2EHPA at 20% v/v in kerosene was tested by contacting the organic phase with 100 g/L Zn in ammoniacal solution at pH 8. Both reagents showed precipitation occurred on shaking, the aqueous solution pH was reduced to <pH 7 due to the loading of each zinc ion into the organic resulting in the transfer of two protons from the organic acid into the aqueous. Increasing the pH through the addition of sodium hydroxide solution or ammonia solution was necessary to redissolve the zinc hydroxide.

Clearly, the transfer of protons from the organic acid results in a decrease in pH of the aqueous solution. The pH decrease reduces the solubility of the zinc by formation of zinc hydroxide.

It was further found that a high aqueous solution pH resulted in extremely stable emulsions after shaking the aqueous and organic phases. However, at high pH there is also a high free ammonia concentration and it was uncertain which was causing the problems with phase disengagement. To resolve this, samples of 10% D2EHPA and Cyanex 272 were mixed with a similar volume of deionised water and stirred. The pH was measured and both were <pH 4. Concentrated ammonia solution was added to raise the pH to 7, the stirring was then stopped and the phases allowed to settle under observation. The pH increase was repeated until there were obvious problems, such as foaming or multiple phase formation. The pH was then lowered using concentrated hydrochloric acid and the separation observed. The summary of these tests for D2EHPA are in the table below.

| pH | observation |
|---|---|
| 7.0 | rapid phase separation |
| 7.5 | rapid phase separation |
| 8.0 | rapid phase separation |
| 8.5 | rapid phase separation |
| 9.0 | rapid phase separation |
| 9.5 | rapid phase separation |
| 10.0 | rapid phase separation, 3 phases present |
| 10.5 | rapid phase separation, 3 phases present |
| 10.0 | rapid phase separation, 3 phases present |
| 9.5 | rapid phase separation |
| 9.0 | rapid phase separation |

From these data, it is clear that three phase formation in D2EHPA occurred at >pH 9.5. A similar run for Cyanex 272 did not give a rapid or clean phase separation at any pH and three phases were formed at >pH 8.5. In both cases the formation of the third phase was reversible by lowering pH.

A similar run using LIX84-I showed that only two rapidly disengaging phases were formed over the range pH 7-11.

Therefore the pH range of the aqueous solution needs to be maintained above pH 8 to prevent precipitation and below pH 10 to prevent multiple phase formation when using D2EHPA. The upper pH may be increased by adding an organic compound to aid phase disengagement, one compound used for this purpose is decan-1-ol. The lower pH may be reduced by increasing the ammonia concentration in the aqueous solution.

Use of Ammonium Salt of D2EHPA

To avoid proton transfer from the D2EHPA during loading a 10% v/v solution of D2EHPA in kerosene was stirred with deionised water to produce an emulsion. Aqueous ammonia was then added to increase the pH of the solution to around pH 9.

Without wishing to be bound by theory, the neutralisation of the organic acid extractant with aqueous ammonia results in the formation of the ammonium salt of that acid via an acid-base reaction:

$$D2EHPA+NH_4^+ \rightleftharpoons NH_4-D2EHP+H^+$$

During the subsequent loading stage the zinc replaces the ammonium forming the zinc salt of the acid:

$$2NH_4-D2EHP+Zn^{2+}=Zn(D2EHP)_2+2NH_4^+$$

As is clear, unlike the conventional loading reaction:

$$2D2EHPA+Zn^{2+}=Zn(D2EHP)_2+2H^+$$

there is no transfer of protons from the organic phase into the aqueous phase and therefore no lowering of pH.

An organic solution of $NH_4$-D2EHP was made by neutralising a 10% v/v solution of D2EHPA in kerosene with aqueous ammonia to pH 9. The organic phase was then shaken with some ammoniacal 10 g/L Zn solution adjusted to pH 9 with ammonia. The final aqueous pH was 9.13, only a slight increase. The phases were separated and fresh zinc solution shaken and decanted, the aqueous pH was 9.18.

An otherwise identical run was made without neutralising the D2EHPA, the final pH after the first loading stage was <7 and zinc hydroxide had precipitated.

Stripping

Conventional zinc solvent extraction processes use a concentrated sulphuric acid as the strip solution. This uses Le Chatelier's principle to reverse the conventional loading reaction given above $$Zn(D2EHP)_2+2H^+=2D2EHPA+Zn^{2+}$$

This results in a high concentration zinc solution suitable for further purification before electrowinning. This also results in the acid form of D2EHP being regenerated. If acid stripping were used, the D2EHPA would need to be converted back into its ammonium salt before recycling back to the loading stage.

This extra neutralisation step can be avoided by using concentrated ammonia solution to do the stripping. Again, this process uses Le Chatelier's principle to reverse the loading reaction shown above $$Zn(D2EHP)_2+2NH_4^+=2NH_4-D2EHP+Zn^{2+}$$

and give a concentrated ammoniacal zinc solution and regenerate the ammonium salt of D2EHP for recycle to the loading stage.

The zinc-loaded organic phase from the above loading experiment was then split and aliquots shaken with concentrated ammonia solutions adjusted to pH 8, 9 and 10. For all three runs, >85% of the zinc was recovered into the aqueous phase showing that the loading-stripping reaction is highly reversible. The final pH of the aqueous phases were 7.7, 9.4 and 10.0 which are very close to the starting pH. The aqueous zinc concentrations of the strip solutions were 13-18 g/L. Even at the lowest aqueous phase pH of 7.7, there was no evidence of precipitation due to the extremely high ammonia concentration stabilising the zinc in its soluble ammine form.

A zinc-loaded organic phase was produced by contacting an organic phase (20% v/v D2EHP in kerosene neutralised to pH 9 with ammonia) with a 10 g/L zinc solution at pH 9. The loaded organic was then shaken with an ammonia solution (concentrated ammonia adjusted to pH 9 then diluted by a factor of two, ~140 g/L ammonia) at a volume ratio of 1:10, aqueous to organic. The phases separated rapidly and the aqueous phase was analysed as containing 62 g/L Zn at pH 9.2.

A higher concentration of D2EHP—$NH_4$ in the organic phase, a higher aqueous to organic ratio and a higher concentration of ammonia in the strip solution would all be expected to result in even higher zinc concentrations in the aqueous strip phase.

The Claims Defining the Invention is as Follows:

1. A method for extracting zinc from an aqueous ammoniacal zinc solution containing impurities, wherein:
   (i) contacting the aqueous ammoniacal zinc solution containing impurities with an organic phase comprising an ammonium salt of an organic extractant dissolved in a hydrophobic diluent, allowing transfer of the zinc to the organic phase and transfer of ammonium to the aqueous solution, thereby providing a zinc-enriched, ammonium-depleted organic phase and an ammonium-enriched, zinc-depleted aqueous phase containing impurities;
   (ii) separating the zinc-enriched, ammonium-depleted organic phase from the ammonium-enriched, zinc-depleted aqueous phase containing impurities;
   (iii) contacting the zinc-enriched, ammonium-depleted organic phase with an aqueous solution containing positively charged species, allowing transfer of the zinc from the organic phase and transfer of positively charged species from the aqueous phase, thereby providing an aqueous zinc solution and an organic phase containing a zinc-depleted organic extractant; and
   (iv) recovering the zinc from the aqueous zinc solution.

2. A method according to claim 1, wherein the aqueous solution containing positively charged species of step (iii) is an acidic solution, and such that step (iii) more specifically compromises:
   contacting the zinc-enriched, ammonium-depleted organic phase with an acidic aqueous solution, allowing transfer of the zinc from the organic phase and transfer of protons from the aqueous phase, thereby providing an aqueous zinc solution and an organic phase containing a zinc-depleted organic acid extractant.

3. A method according to claim 2, wherein, after the step of contacting the zinc-enriched, ammonium-depleted organic phase with an acidic aqueous solution, allowing transfer of the zinc from the organic phase and transfer of protons from the aqueous phase, thereby providing an aqueous zinc solution and an organic phase containing a zinc-depleted organic acid extractant, the method comprises the step of:
   contacting the zinc-depleted organic acid extractant with an aqueous ammonium solution to produce an ammonium salt of the organic acid extractant.

4. A method according to claim 1, wherein the aqueous solution containing positively charged species of step (iii) is an aqueous ammonium solution, such that step (iii) more specifically comprises:
   contacting the zinc-enriched, ammonium-depleted organic phase with an aqueous solution of ammonia, allowing transfer of the zinc from the organic phase and transfer of ammonium from the aqueous phase, thereby providing an aqueous ammoniacal zinc solution and an organic phase containing an ammonium salt of the organic extractant.

5. A method according to claim 4, wherein the method is performed in a continuous manner, and at least a portion of the organic phase containing an ammonium salt of an organic extractant of step (i) is provided by the organic phase containing an ammonium salt of the organic extractant provided by step (iii).

6. A method according to claim 4, wherein the step of:
   contacting the aqueous ammoniacal zinc solution containing impurities with an organic phase comprising an ammonium salt of an organic extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;
   more specifically comprises:
   contacting the aqueous ammoniacal zinc solution containing impurities with an organic base comprising an ammonium salt of an organic extractant and a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities, wherein the pH of the aqueous ammoniacal zinc solution is maintained between about 6 and about 12.

7. A method according to claim 4, wherein the pH of the aqueous ammoniacal zinc solution containing impurities is maintained between about 7 and about 12.

8. A method according to claim 7, wherein the pH of the aqueous ammoniacal zinc solution containing impurities of step (i) is between about 8.5 and about 9.5.

9. A method according to claim 4, wherein the step of:
   contacting the aqueous ammoniacal zinc solution containing impurities with an organic phase comprising an ammonium salt of an organic extractant and a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;
   more specifically comprises:
   contacting the aqueous ammoniacal zinc solution containing impurities with an organic phase comprising an ammonium salt of an organic extractant and a hydrophobic diluent, allowing transfer of the zinc to the organic phase and transfer of ammonium to the aqueous phase, thereby providing a zinc-enriched, ammonium-depleted aqueous phase containing impurities, wherein the pH of the aqueous ammoniacal zinc solution is maintained at approximately pH 9.5.

10. A method according to claim 4, wherein the step of:
    contacting the aqueous ammoniacal zinc solution containing impurities with an organic phase comprising an ammonium salt of an organic extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;
    more specifically comprising the steps of:
    contacting the aqueous ammoniacal zinc solution containing impurities with an organic phase comprising an ammonium salt of an organic extractant and a hydrophobic diluent, allowing transfer of the zinc to the organic phase and transfer of ammonium to the aqueous phase, in the presence of a phase-disengagement enhancing compound, thereby providing a zinc-enriched, ammonium-depleted organic phase and an ammonium-enriched, zinc-depleted aqueous phase containing impurities.

11. A method according to claim 10, wherein the phase-disengagement enhancing compound is an alcohol.

12. A method according to claim 11, wherein the alcohol is selected from the group: decan-1-ol, 2-ethyl hexanol, and p-nonyl phenol.

13. A method according to claim 10, wherein the phase-disengagement enhancing compound is tributyl phosphate.

14. A method according to claim 10, wherein the phase-disengagement enhancing compound is trioctyl phosphine oxide.

15. A method according to claim 1, wherein the aqueous ammoniacal zinc solution is produced by ammoniacal leaching of a zinc-containing ore.

16. A method according to claim 15, wherein the aqueous ammoniacal zinc solution is produced by ammoniacal leaching of an oxidised zinc-containing ore.

17. A method according to claim 1, wherein the method is performed at elevated temperature.

18. A method according to claim 1, wherein the organic extractant is selected from the group: carboxylic acid derivatives, organic derivatives of phosphorus-based acids, organic derivatives of sulfur-based acids and oximes.

19. A method according to claim 1, wherein the organic extractant is an organic derivative of phosphoric acid.

20. A method according to claim 19, wherein the organic extractant is di(2-ethylhexyl)phosphoric acid (D2EHPA).

21. A method according to claim 1, wherein the diluent is selected from the group: an aliphatic solvent, an aromatic solvent, or a mixture thereof.

22. A method according to claim 21, wherein the diluent substantially comprises kerosene.

* * * * *

UNITED STATES PATENT AND TRADEMARK OFFICE
CERTIFICATE OF CORRECTION

PATENT NO. : 8,323,596 B2
APPLICATION NO. : 13/141192
DATED : December 4, 2012
INVENTOR(S) : Garry Mervyn Johnston et al.

Page 1 of 1

It is certified that error appears in the above-identified patent and that said Letters Patent is hereby corrected as shown below:

In the Specifications

Column 5, Line 23
"$2NII_4R+Zn^{2+}=ZnR_2 + 2NII_4^+$" should be --$2NH_4R+Zn^{2+}=ZnR_2 + 2NH_4^+$--

Column 14, Line 22
"clcar" should be --clear--

Column 14, Line 22
"rcaction" should be --reaction--

Signed and Sealed this
Thirtieth Day of April, 2013

Teresa Stanek Rea
*Acting Director of the United States Patent and Trademark Office*